(12) United States Patent
Saddoughi et al.

(10) Patent No.: US 7,520,123 B2
(45) Date of Patent: Apr. 21, 2009

(54) MIXING-ENHANCEMENT INSERTS FOR PULSE DETONATION CHAMBERS

(75) Inventors: Seyed Saddoughi, Clifton Park, NY (US); Pierre Pinard, Clifton Park, NY (US); Matthew Boespflug, Clifton Park, NY (US); Dennis Steenburgh, Caroga Lake, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 720 days.

(21) Appl. No.: 11/127,459

(22) Filed: May 12, 2005

(65) Prior Publication Data

US 2006/0254254 A1 Nov. 16, 2006

(51) Int. Cl.
*F02K 7/00* (2006.01)
*F02C 5/02* (2006.01)

(52) U.S. Cl. .................. 60/247; 60/39.38; 60/39.76; 60/224

(58) Field of Classification Search .......... 60/224, 60/247, 39.38, 39.76, 738, 750
See application file for complete search history.

(56) References Cited

U.S. PATENT DOCUMENTS

| 3,263,418 | A | * | 8/1966 | Lange et al. ............... 60/247 |
| 5,473,885 | A | | 12/1995 | Hunter, Jr. et al. |
| 5,513,489 | A | * | 5/1996 | Bussing .................. 60/39.38 |
| 6,112,512 | A | | 9/2000 | Miller et al. |
| 6,349,538 | B1 | * | 2/2002 | Hunter et al. ............. 60/204 |
| 6,629,647 | B2 | | 10/2003 | Boecking |
| 6,869,049 | B2 | | 3/2005 | Saddoughi |

* cited by examiner

*Primary Examiner*—Michael Cuff
*Assistant Examiner*—Phutthiwat Wongwian
(74) *Attorney, Agent, or Firm*—Bracewell & Giuliani LLP

(57) ABSTRACT

The present invention provides a pulse detonation insert that induces flow obstructions within the pulse detonation chambers, wherein the flow obstructions are operable to induce turbulence within a primary fluid flow passing over the obstructions. This turbulence may take the form of vortices that enhance the mixing of the oxidizer and fuel within the primary flow. Additionally, supports couple to the pulse detonation chamber walls and flow obstructions to hold the flow obstructions in place within the pulse detonation chamber. The combustion/Detonation of the mixed oxidizing fuel results in an increased velocity of the primary flow exiting the pulse detonation chamber and reduced the amount of unburnt fuel within the exhaust.

10 Claims, 15 Drawing Sheets

Stage 4

Stage 5

MIXING-ENHANCEMENT INSERTS FOR PULSE DETONATION CHAMBERS

CROSS-REFERENCE TO RELATED APPLICATION

This application is related to: U.S. Pat. No. 6,112,512 (the '512 patent) issued to Miller et al., filed Aug. 5, 1997 entitled "METHOD AND APPARATUS OF PULSED INJECTION FOR IMPROVED NOZZLE FLOW CONTROL"; U.S. Pat. No. 6,869,049 issued to Seyed Saddoughi, filed Jul. 24, 2002 entitled "METHOD AND APPARATUS FOR MODULATING FLOW SEPARATION"; U.S. Pat. No. 6,629,647 issued to Friedrich Boecking, filed Jun. 29, 2001 entitled "PRESSURE-CONTROLLED INJECTOR WITH CONTROLLED NOZZLE NEEDLE"; U.S. Pat. No. 5,473,885 issued to Hunter, Jr. et al., filed Jun. 24, 1994 entitled "PULSE DETONATION ENGINE," which are all hereby incorporated by reference in their entirety.

TECHNICAL FIELD OF THE INVENTION

The present invention relates generally to the field of fluid flow control, and more particularly, to a system and method to enhance fuel and oxidizer mixing with increased turbulence provided by inserts located within pulse detonation chamber(s).

BACKGROUND OF THE INVENTION

Pulse detonation engines (PDE) conceptually allow high-speed cruise capability with a low cost reliable system. PDEs incorporate many practical engineering advances over existing engines such as a gas turbine. Pulse detonation involves detonation of fuel to produce thrust more efficiently than existing systems. Pulse detonation is more efficient because of mechanical simplicity and thermodynamic efficiency. For example, PDEs have fewer moving parts, are lighter weight, and require lower cost to maintain and operate.

Application of the pulse detonation cycle requires coupling the high thermal efficiency of the detonation cycle with high propulsion efficiency in a practical device. PDEs detonate combustible mixtures to produce thrust from high velocity exhaust gases within a high pressure and temperature environment. Practical PDE designs include multiple detonation chambers to obtain high aggregate operating frequencies and quasi-steady thrust. Current combustion system models predict high propulsion efficiencies for PDEs and good thrust characteristics from low subsonic to high supersonic type regimes. Pulse detonation technology may be applied to actuators to manipulate fluid flow as well.

One of the key requirements for pulse detonation is that detonation initiation be achieved in as short a distance as possible from the thrust plate. For a PDE operating with a typical gas mixture of JP-10 fuel and air, direct detonation initiation at the thrust wall is not possible since the critical initiation energy is much too high for a practical ignition system. Thus, a need exists to improve mixing of fuel and oxidizer to achieve detonation proximate to the thrust wall. One alternative to direct initiation is commonly referred to as deflagration to detonation transition. This is the process by which a flame accelerates to a velocity on the order of 1,000 meters per second and the detonation initiation occurs in the region between the frame and a precursor shockwave. The low reactivity of prototypic fuel air mixtures causes the detonation run-up distance to be relatively large and thus prohibitive for practical engine designs.

To overcome such problems, solutions consider fuel oxygen mixtures in a pre-chamber approach. Although this may meet the objective of detonation initiation within a short distance, the need for an onboard oxidizer complicates the PDE by adding additional parts with associated cost and weight, while also imposing significant safety hazards. More desirable approaches are required that enhance the detonation process in a fuel air mixture by reducing the run-up distance without the use of additional oxygen.

Various aircraft, such as tactical aircraft, have one or more jet engines that produce thrust corresponding to the exhaust coming from a nozzle of the jet engine. The weight and cost of tactical aircraft exhaust systems have increased at an alarming rate with the incorporation of features for afterburning, thrust vectoring, and advanced shaping. Historically, afterburning and vectoring have required variation of the nozzle geometry. For example, a typical turbo fan engine's nozzle throat area must increase in size when afterburning. Vectoring has required deflection of nozzle flaps, and sometimes rotation of the entire nozzle assembly. Aperture shaping for afterbody integration further imposes the use of less structurally efficient two-dimensional, rather than axis-symmetric, nozzles. These capabilities require greater mechanical complexity in the various systems. A large number of modern jet aircraft employ after burner equipped low bypass turbo fan or turbojet engines. In such engines, fuel is injected into the hot exhaust stream and ignited. The resulting combustion accelerates the exhaust to increase thrust. This solution, while effective, is not fuel efficient as significant amounts of unburned fuel are exhausted.

To simplify the nozzle geometry and complexity, actuators may be incorporated into the engine to allow afterburning, thrust vectoring and advanced shaping of the exhaust flow. These actuators may add some complexity in exchange for reducing the weight of jet engines and their associated nozzle configurations. These actuators inject a cross-flow into the primary flow. For example, U.S. Pat. No. 6,112,512 (the '512 patent) issued to Miller et al., which is hereby incorporated by reference, provides a method and apparatus for pulsed injection for improved nozzle flow control. This flow control uses engine bleed from the compressor of the jet engine to inject air as a pulsed cross-flow into the primary flow in the nozzle. However, bleeding air from the engine takes away mass flow rate of the primary flow, which reduces the thrust and efficiency of the jet engine. Therefore, a requirement exists for solutions that reduce the need for compressor bleed air for controlling the nozzle jet.

SUMMARY OF THE INVENTION

Embodiments of the present invention provide pulse detonation chamber insert(s) that substantially addresses the above-identified needs as well as others that may be associated with pulse detonation engines or actuators. More specifically, these embodiments may provide a pulse detonation insert that induces flow obstructions within the pulse detonation chamber operable to induce turbulence within a primary fluid flow passing over or proximate to the obstructions. This turbulence may take the form of vortices that enhance the mixing of the oxidizer and fuel within the primary flow. This enhanced mixing may reduce the detonation run-up distance from the thrust wall, increase thrust, and reduce or eliminate the amount of unoxidized fuel within the exhaust. Mechanical supports couple to the pulse detonation chamber walls and flow obstructions to position the flow obstructions within the pulse detonation chamber. The flow obstructions and supports may be fabricated from materials resistant to the high pressure and temperature environment of the pulse detonation chamber.

The combustion of the oxidizer and fuel mixture results in an increased velocity of the primary flow exiting the pulse detonation chamber. This pulse detonation chamber may be utilized within a pulse detonation actuator (PDA), a pulse detonation engine (PDE), a pulse detonation rocket engine (PDRE), or a hybrid pulse detonation PDE coupled to either a conventional engine such as a turbofan or a turbojet or a high-performance engine such as a ramjet or scramjet engine.

Another embodiment provides a pulse detonation engine. This pulse detonation engine includes an oxidizer source, a fuel source, a distribution manifold, and a pulse detonation chamber within which a pulsed detonation chamber insert is placed. The distribution manifold couples to the oxidizer source and the fuel source to deliver a fuel and oxidizer mixture to the pulse detonation chamber. The pulse detonation chamber receives the mixed fuel and oxidizer. This pulse detonation chamber includes containment walls that are operable to containing the pulse detonation, a thrust wall on which thrust is imparted by the pulsed detonation, and an exhaust opening from which the high velocity exhaust gas leaves the detonator tube or combustion chamber. The insert provided in the flow pathway of the mixed fuel and oxidizer within the pulse detonation chamber, induces turbulence in the flow pathway of the mixed fuel and oxidizer. This turbulence enhances the mixing of the fuel and oxidizer. An igniter positioned within the pulse detonation chamber ignites the mixed fuel and oxidizer to produce the pulse detonation.

Yet another embodiment utilizes a pulse detonation insert within a hybrid pulse detonation engine. In this embodiment a conventional engine produces an exhaust flow that may be provided to an intake of a pulse detonation engine. Alternatively, secondary air may be bled from the primary flow of the conventional engine. In this embodiment, the PDE is used in parallel rather than in series with the conventional engine. Such conventional engines include turbofan or turboprop, or turbojet engines. In another embodiment, a hybrid pulse detonation engine may couple a pulse detonation engine with a high performance engine such as a ramjet or scramjet. In such a case, the pulse detonation engine provides a high velocity exhaust flow as the input flow to the high performance engine component.

Yet another embodiment applies pulse detonation technology to provide pulse detonation actuator(s) (PDAs) operable to manipulate fluid flow. Here the exhaust of the PDA creates instabilities within a primary fluid flow. A control system may be coupled to the PDA to actively control the use of the PDA to manipulate fluid flow. Examples of such applications include thrust vectoring of the jet engine exhaust or manipulating fluid flow within serpentine ducts or over aerodynamic surfaces.

Pulse detonation technology reduces the number of moving parts when compared to traditional compressors used to provide a fluid flow to control jets. Alternatively, this technology reduces or eliminates the inefficient use of bleed air from the primary flow to control the primary flow. PDEs utilize an inherently simple mechanical design and provide higher thermodynamic efficiency than conventional engines.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Pulse detonation is a propulsion technology that detonates fuel to produce thrust more efficiently than existing solutions. Pulse detonation engines produce a higher specific thrust and may be used as a part of a multi-stage propulsion system. Additionally, the pulse detonation engine may provide static thrust for ram-jet or scram-jet engines or operate in combination with turbo-fan systems. As such, many potential applications exist for pulse detonation engines.

Pulse detonation engines are an extension of pulse-jet engines that share many similarities. However, an important difference exists. Pulse detonation engines detonate rather than deflagrate their fuel. The detonation of fuel results in immense pressure which in turn may be used as thrust. Deflagration is a relatively gentle process of burning fuel rapidly with flames. One of the main characteristics of deflagration is that the flame travels at subsonic speeds. Detonation can be thought of as a violent reaction that travels at supersonic speeds. Detonation produces a much higher amount of pressure and thrust when compared to deflagration.

Figure 1:
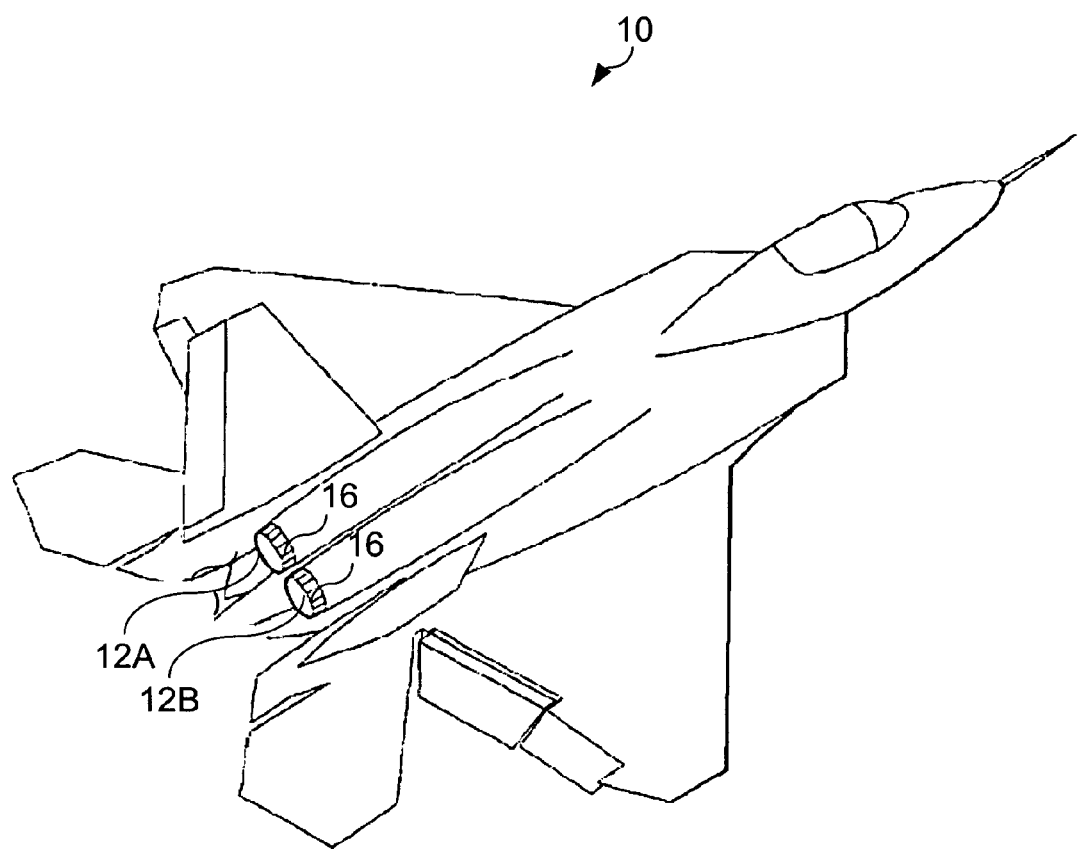
FIG. 1 is a perspective view of an aircraft having a pair of jet engines with exhaust nozzles, in which the flow through the nozzles may be controlled or supplemented by pulse detonation ejection in accordance with embodiments of the present invention.

FIG. 1 is a perspective view of an aircraft 10 having a pair of jet engines 12A and 12B. In the illustrated embodiment, aircraft 10 is the Lockheed F-22 Raptor; however, aircraft 10 may be any suitable aircraft or other machine employing one or more jet engines, such as jet engines 12A and 12B.

Jet engine 12A and 12B, will be described more fully below in conjunction with FIGS. 7 and 8, creates thrust for aircraft 10 by directing a high-energy fluid flow from an exhaust nozzle 16. To change the speed or direction of aircraft 10, the thrust is either changed in magnitude or direction. There are various ways to accomplish this alteration of the thrust. One such way is to use pulsed detonation injection.

Figure 2:
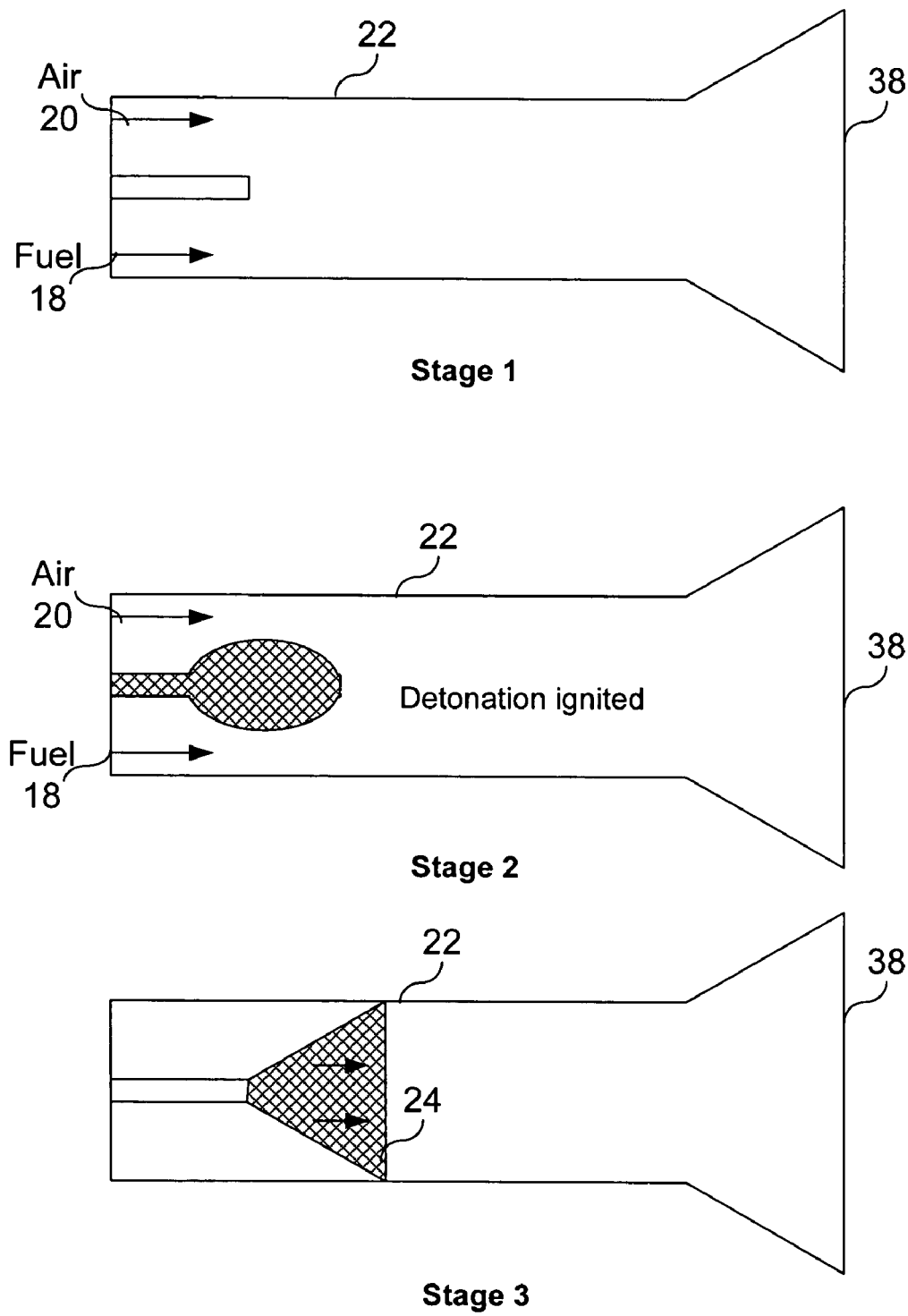
FIG. 2 illustrates the various stages associated with the pulse detonation engine cycle.
Figure 2:
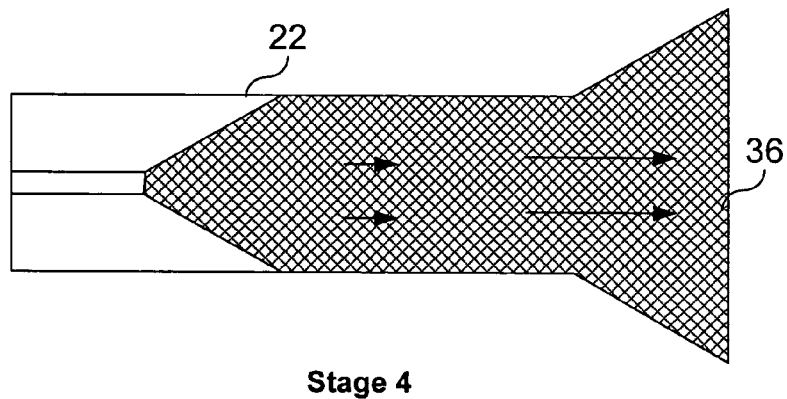
Figure 2:
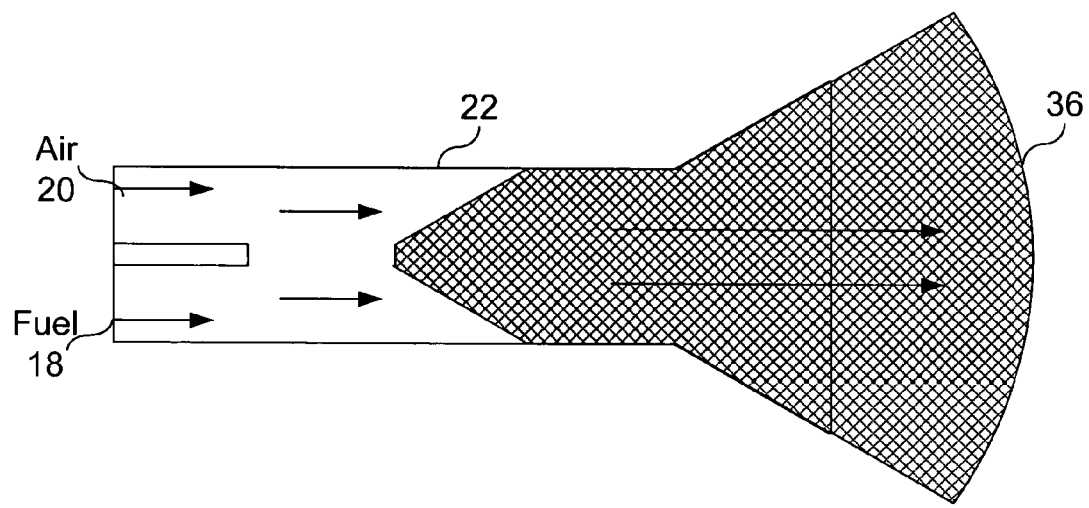

FIG. 2 illustrates the stages of the pulse detonation engine wave cycle. In stage 1, fuel 18 is mixed with air 20. Air 20 and fuel 18 are drawn through inlets into pulse detonation chamber 22. In an air-breathing engine, no additional oxidizer is required. Fuel 18 and air 20 combine to create a flammable mixture either prior to delivery to the detonation chamber or within the detonation chamber. Detonation occurs in stage 2. Upon detonation, the pressure of the mixture increases tremendously creating a shockwave 24 that travels the length of chamber 22.

Figure 3:
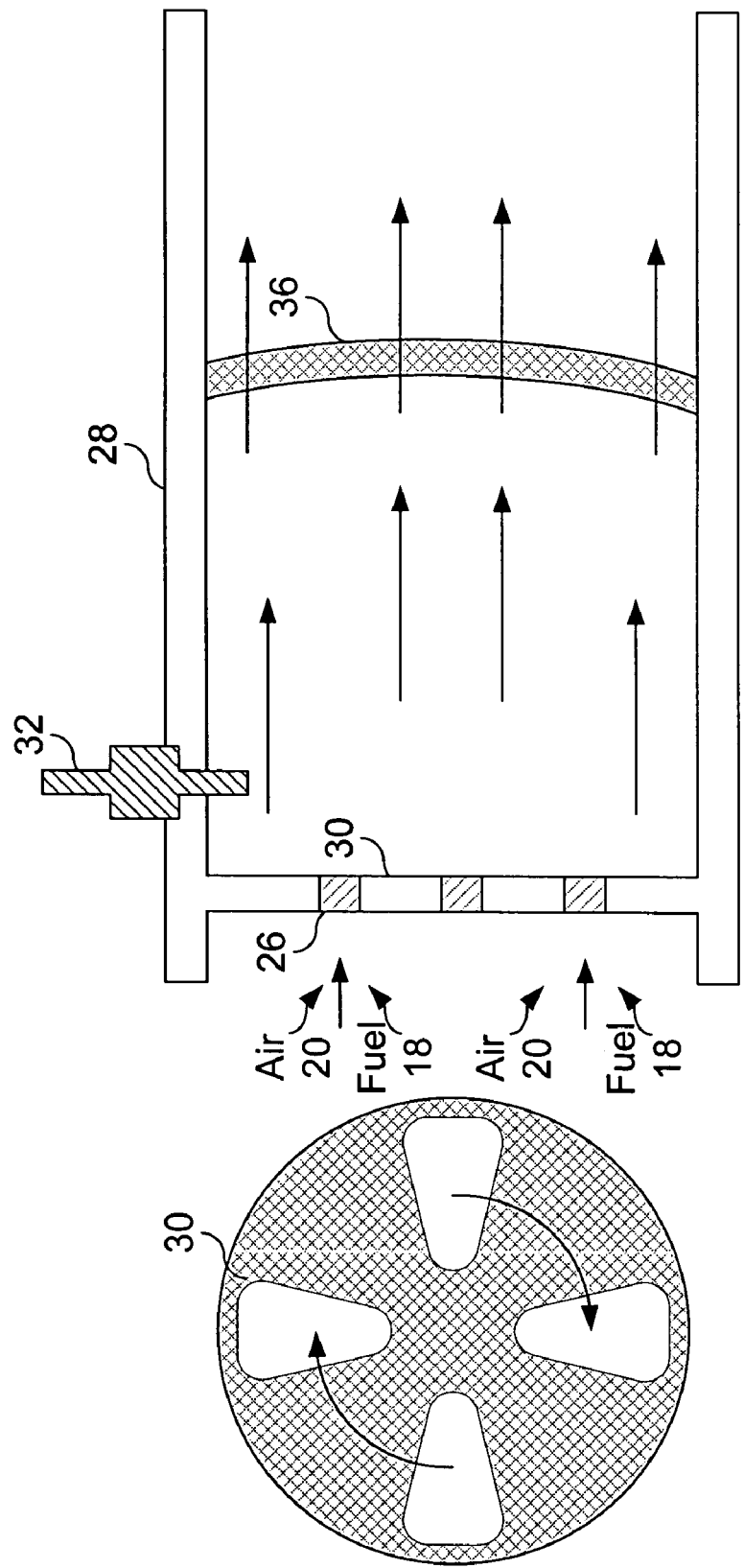
FIG. 3 is a cross-sectional view of a typical configuration of a pulse detonation engine that highlights major components.

A typical pulse detonation engine 30, such as that of FIG. 3, may further illustrate the pulse detonation wave cycle of FIG. 2. Fuel 18 is provided via fuel inlet 26 into pulse detonation engine 16. Both air and fuel may pass into detonator tube 28 using a valving system such as a rotary valve 30.

Air 20 and fuel 18 mix and detonate as triggered by igniter 32 to the right of thrust wall 34. Upon detonation, the pressure of the mixture increases tremendously and creates a shockwave 36 that travels the length of the pulse detonation chamber 22 and illustrated in stage 3.

In stage 4, shockwave 36 reaches the end of detonation chamber 22, and combustion products are discharged from pulse detonation chamber 22. High pressure gas fills the pulse detonation chamber. In stage 5, as detonation wave 36 exits the engine, air 20 and fuel 18 are again drawn in by the reduced pressure. This air drawn as the pressure inside the pulse detonation chamber suddenly falls. Air and fuel enter through rotary valve or other like means. This process may be repeated a number of times per second.

Despite engineering and material difficulties, the underlying principles are simple. The detonation process substantially increases the pressure within the pulse detonation chamber. Thus, fuel does not have to be injected at high pressures as is necessary for significant thrust with conventional engines. This eliminates the need for robust fuel injection pumps. Additionally, this pressure compresses the intake air thus mitigating the need for compressors, turbines or other complex and heavy components typical of conventionally-fueled engines. The pulse detonation engine specifically avoids the mechanical complexity of compressors or most other rotating machinery in the airflow path. Thus, the pulse detonation engine generally demonstrates a lower part count than other engine types.

The mechanical simplicity offers many benefits to the propulsion system. The lower part count simplifies maintenance procedures. Also, the lower part count contributes to an overall lighter engine improving the thrust to mass ratio of equivalent engine systems. The simplicity as well as the reduced weight leads to decreased cost of ownership and operation associated with PDE propulsion systems. Hybrid pulse detonation engines may combine turbo-fan technology with the pulse detonation technology. Such a hybrid pulse detonation engine(s) allow aircraft to operate more efficiently thus significantly reducing emissions. Similarly, pulse detonation technology may be used in place of afterburner equipped low-bypass turbo-fan or turbo-jet engines. In such engines, fuel is injected into the hot exhaust stream. The resulting combustion causes the exhaust gas to accelerate and thus increase thrust. Although this process is an effective solution, it is not a fuel-efficient solution. Hybrid pulse detonation engines may deliver the same thrust with less fuel consumption.

In addition to employing pulse detonation engines, this technology may be applied to control flow within conventional jet engines. By increasing mixing and turbulence levels within the chamber, a better combustion process may result. In addition to reducing uncombusted fuel within the exhaust, enhanced mixing may also allow the detonation to occur in closer proximity to the thrust wall again increasing the overall efficiency of the pulse detonation.

Figure 4:
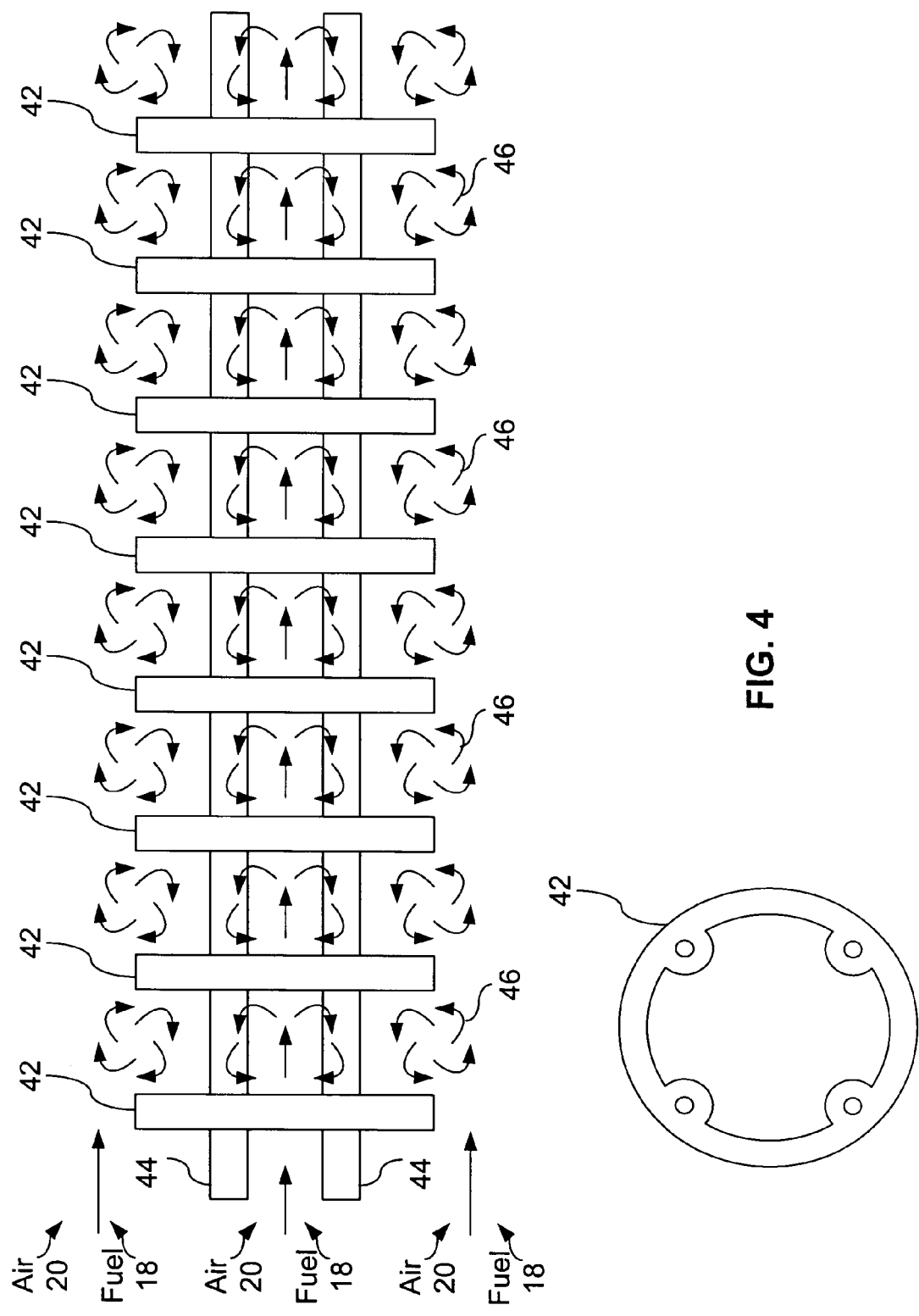
FIG. 4 provides a cross-sectional view of a pulse detonation chamber insert that may be employed to improve combustion within a pulse detonation chamber in accordance with embodiments of the present invention.

FIG. 4 depicts one embodiment of a pulse detonation chamber insert 40 operable to enhance fuel and oxidizer mixing with turbulence which will result in a higher velocity exhaust. Insert 40 includes a series of discs or rings 42 mechanically coupled by supporting rods 44. Rings 42 may be shaped similar to a circular ring and are mechanically coupled to rods 44 by threads, mechanical fasteners, or other means known to those having skill in the art. One specific embodiment uses four rods 44 within the chamber. However, the number of rings 42 and rods 44 may vary depending on the geometry of the pulse detonation chamber. Turbulence, which may take the form of vortices 46, is created as fluid flow 48 passes over the edges of discs 42. Although the flow obstructions used to increase turbulence in this embodiment are discs, other geometries may be employed to achieve similar results. Vortices 46 further mix oxidizer and fuel within fluid flow 48 to improve combustion.

Figure 5:
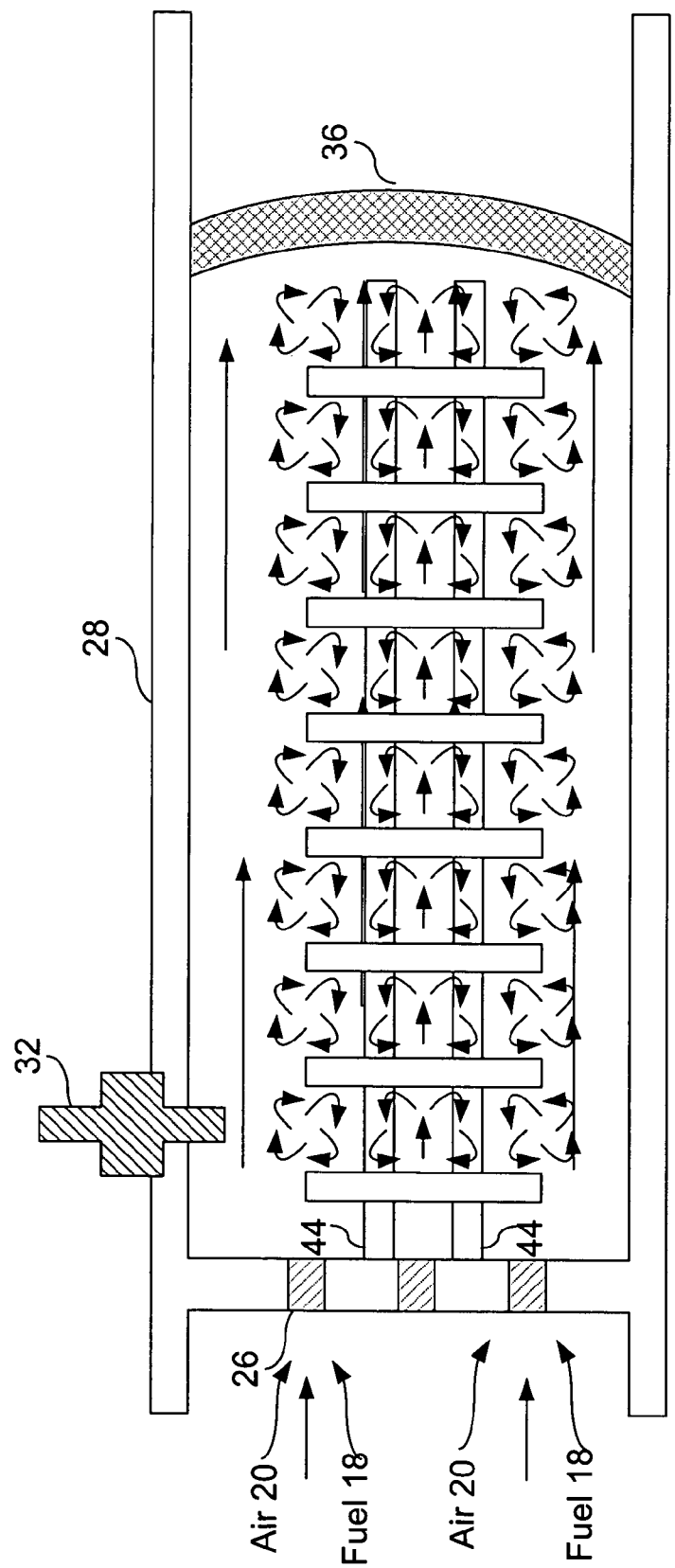
FIG. 5 provides a schematic configuration of a pulse detonation engine utilizing a pulse detonation chamber insert in accordance with an embodiment of the present invention.

FIG. 5 depicts a pulse detonation insert 40 within pulse detonation chamber 28. Here, the oxidizer and fuel mixture are further mixed by turbulence 46 encountered as mixture 50 passes over the edges of discs 42. Vortices 46 are produced and hence increased turbulence levels. This enhances the mixing of oxidizer 20 and fuel 18 within mixture 50. Insert 40 may increase the exhaust velocity and efficiency of detonation.

Figure 6:
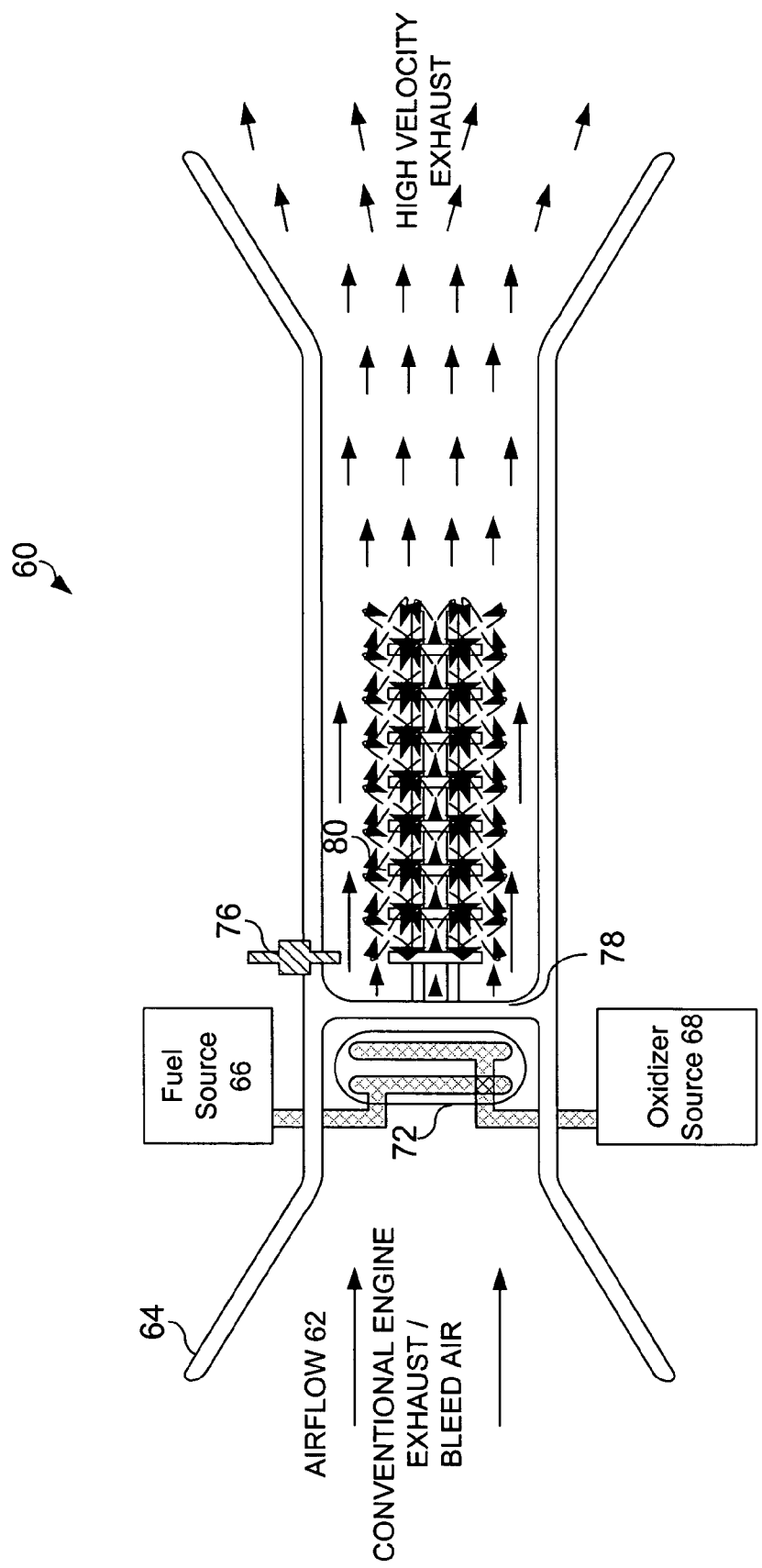
FIG. 6 provides a schematic configuration of a hybrid pulse detonation engine employing the pulse detonation chamber insert in accordance with embodiment(s) of the present invention.

FIG. 6 illustrates a hybrid pulse detonation engine. Hybrid pulse detonation engine 60 is coupled to the exhaust of a turbo jet or turbo fan. Airflow 62 may be a prior stage or bleed air provided in parallel to inlet 64. Fuel and oxidizer sources 66 and 68 are provided through distribution manifolds 70. The oxidizer may simply be intake air and does not require engine bleed air from the turbojet or turbofan. Oxidizer and fuel are mixed by mixer 72 and then supplied to detonation chamber 74. Igniter 76, proximate to thrust wall 78, initiates combustion of the fuel and oxidizer mixture. However, igniter 76 is not required to be proximate to thrust wall 78 to achieve ignition and acceptable results. To achieve a higher exhaust velocity, it is desirable to increase the speed at which the fuel/air mixture is burnt. This speed may be increased by the introduction of turbulence 80 to enhance the mixing of the oxidizer and fuel in detonation chamber 74. Insert 40, such s that described in FIGS. 4 and 5, may be used within detonation chamber 74 to enhance mixing within the chamber.

Pulse detonation device(s) may also be used to manipulate fluid flow as will be described with respect to FIGS. 7-9. For example, this technology may be applied to an afterburner where the increased mixing of the jet fuel injected into the hot exhaust would increase the efficiency of combustion and in so doing increase thrust while reducing fuel consumption. Additionally, this is accomplished with fewer moving parts.

Active flow control enables modification of flow structures to affect the performance of aerodynamic and propulsion systems. These modifications increase range and maneuverability while reducing acoustic loads, signature, weight, and cost. These modifications are typically achieved by using a small amount of a secondary flow or bleed air to enhance naturally occurring instabilities in the main flow. Actuator, such as a pulse detonation actuator (PDA), produce pulsating supersonic jets by employing pulse detonation technology that uses only a small amount of external air and fuel to affect the flow control actuators while employing minimal systems with which to inject the flow instabilities.

Figure 7:
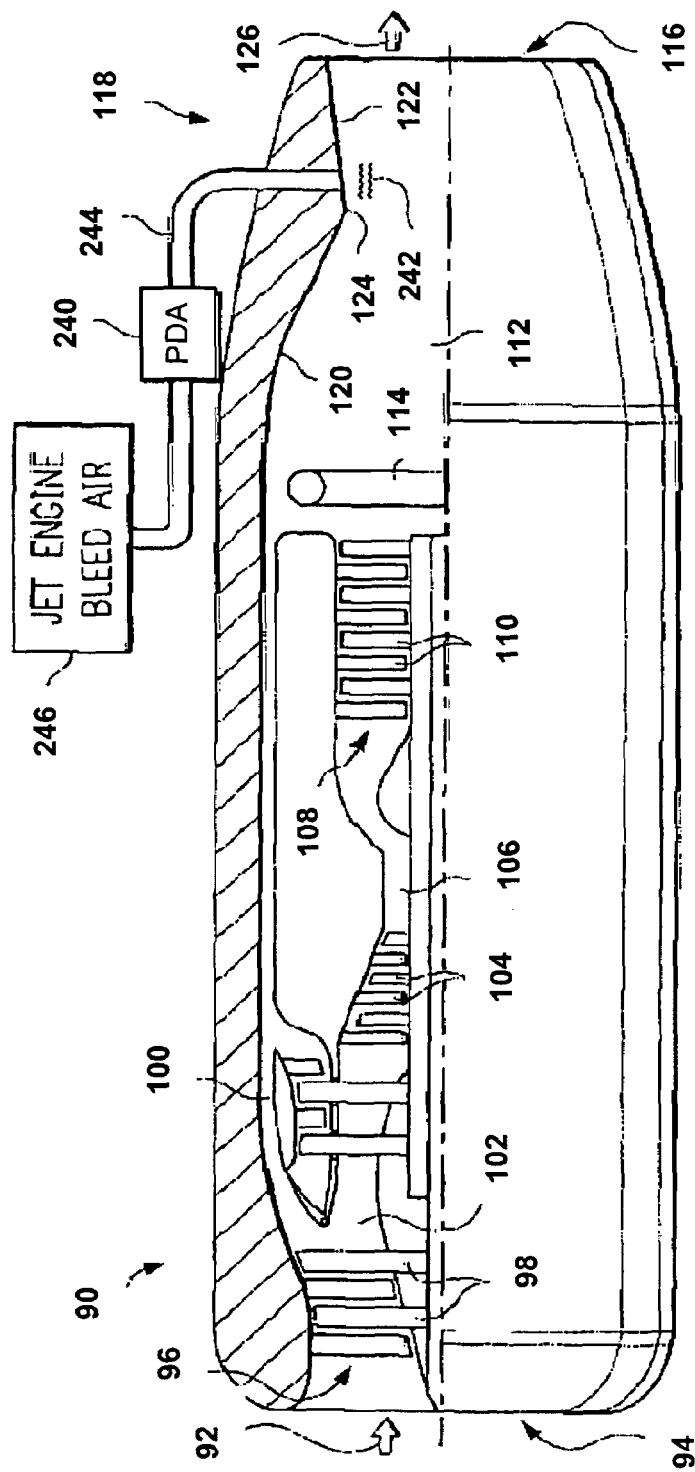
FIG. 7 is a partial cross-section view of a jet engine utilizing pulse detonation actuators to manipulate primary fluid flow within the jet engine.

FIG. 7 is an elevation view, in partial cross-section, of a conventional jet engine 94. Fluid flow 92 that contains air which enters jet engine 90 through intake 94. Fan section 96 that includes a number of rotating fan blades 94, pushes fluid flow 92 into bypass section 100 and compressor section 102. Compressor section 102 uses compressor blades 104 to compress flow 102 into combustion chamber 106. Fuel mixes with fluid flow 72 in combustion chamber 106 and ignites 92, thereby adding energy to fluid flow 92, resulting in an increased pressure and temperature of fluid flow 92. Pressure within combustion chamber 106 forces fluid flow 92 into turbine section 108 and through a number of turbine blades 110. Turbine section 108 extracts energy from fluid flow 92 to power compressor section 102 and fan section 106. Fluid flow 92 then passes into exhaust chamber 112, where the primary fluid flow combines with flow from bypass section 100. Afterburner 114 may provide additional fuel to be ignited to increase the energy of fluid flow 92. Fluid flow 92 then exhausts from engine 90 through exit 116 as an exhaust flow. Nozzle 118 may accept fluid flow 92 from exhaust chamber 112 and to accelerate fluid flow 92 to higher velocities, typically supersonic velocities.

Nozzle 118 includes a converging portion 120, a diverging portion 122 downstream of converging portion 120, and a throat 124 coupling converging portion 120 and diverging portion 122. Typically, as fluid flow 92 passes through throat 124 of nozzle 118, the flow expands and accelerates from subsonic to supersonic speeds, essentially translating the energy of an exhaust flow 136 from pressure into a velocity. The energy within exhaust chamber 112 generally relates to velocity of the air as it exits nozzle 118. The greater the velocity of a given mass flow of air exiting engine 90, the greater thrust created. To vector, manipulate or alter the thrust created by engine 90, the effective cross-sectional area of throat 126 of nozzle 118 may be changed by altering boundary conditions at the surface of the nozzle or other like means known to those having skill in the art may be employed. To change the direction of flight of an aircraft, the thrust may be vectored. One way of accomplishing this is to provide pulse detonation devices or actuators operable to inject a fluid as described in detail previously.

Figure 8:
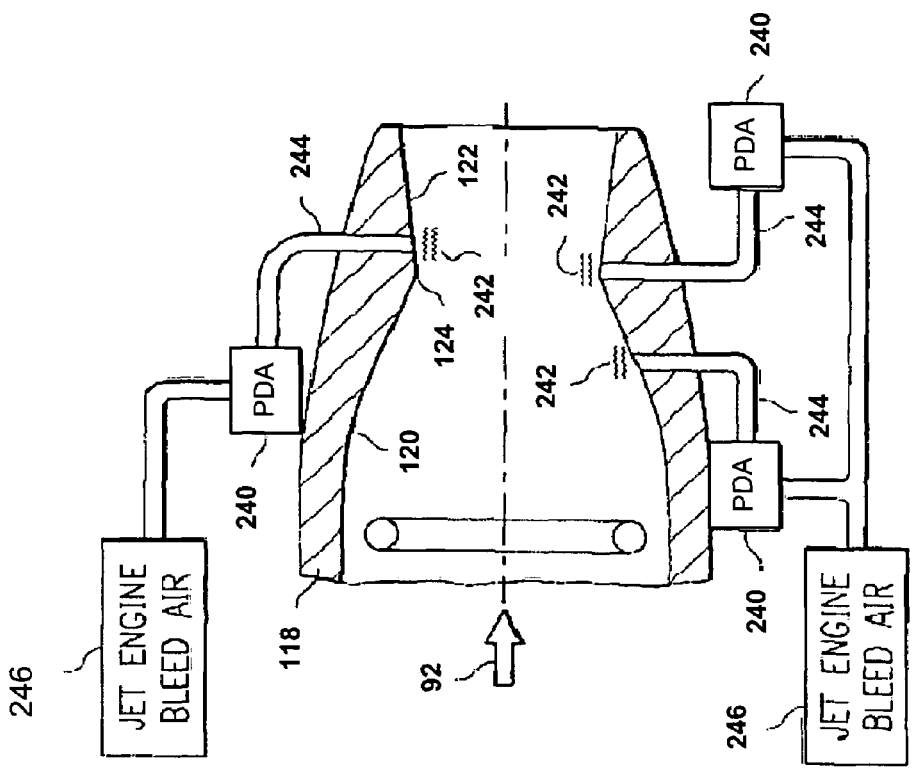
FIG. 8 is an additional cross-sectional view of a jet engine that employs pulse detonation actuators to manipulate fluid flow exhausting from the jet engine.

FIG. 8 is a cross-sectional view of nozzle 118 of jet engine 90 illustrating details of a system for manipulating or vectoring fluid flow 92. A number of pulse detonation devices or actuators 240 are located within the interior of nozzle 118 and inject fluid via ports 244. Pulse detonation actuators 240 may inject secondary flows such as detonation waves 242 through port 244 and into primary fluid flow 92 to achieve this.

Nozzle 118, although depicted in FIG. 3 as a fixed geometry nozzle having a circular cross-section, may be any suitably shaped nozzle having either a fixed or variable geometry. Nozzle 118 may be formed from a suitable material and may be formed with any suitable wall thickness. Again, the function of nozzle 118 is to expand and accelerate fluid flow 92 from subsonic to supersonic speeds so that thrust may be created for aircraft 10.

Pulse detonation actuator 240 may be any suitable device that creates detonation waves in a pulsed manner. One such pulse detonation device is described in U.S. Pat. No. 5,473,885 issued to Hunter, Jr. et al., which is herein incorporated by reference. In a particular embodiment, pulse detonation actuator 240 is controlled by a computer processor operable to execute software instructions to control the effective cross-sectional area of the throat of nozzle 118 over a range of operating conditions. Pulse detonation actuators are relatively simple as they may use either bleed air 246 from jet engine 90, as shown, or ambient air.

Detonation waves 242 are very powerful waves that move extremely fast. Detonation waves 342, which have a pressure ratio of approximately 20-to-1, may be pulsed at a predetermined frequency, such as between approximately 10 hertz and approximately 1000 hertz, or may be pulsed at a variable frequency. Detonation waves 242 can theoretically travel inside port 244 at a speed approaching the Chapman-Jouget wave speed. Contrast this with a wave generated during a deflagration combustion process that travels at a speed of approximately 200 feet per second.

Detonation waves 242 enter the interior of nozzle 118 followed by products of combustion, which typically are traveling at approximately 1000 feet per second. The increased energy (momentum and enthalpy) associated with pulsed detonation injection may be used to efficiently control the cross flow.

Ports 244 are any suitable ports formed in wall of nozzle 118 to transport detonation waves 242. Ports 246 are angled with respect to fluid flow 92 at the exit of port 244. As shown, ports 244 are perpendicular to fluid flow 92; however, ports 244 may be angled opposing or coinciding with fluid flow 92. Ports 244 are located anywhere circumferentially or longitudinally in nozzle 118. For example, ports 244 may be located in converging section 120, throat 124, and diverging portion 122. When ports 244 are proximate to throat 124, detonation waves 242 may vary the effective cross-sectional area and orientation of nozzle 118. Other embodiments may port 244 to provide asymmetric cross-flow field to vector fluid flow through nozzle 118. PDAs may be positioned such that their exhaust may simultaneously throttle and vector fluid flow 92. In an embodiment where the PDA exhaust throttle fluid flow 92 by decreasing the effective cross-sectional area of throat 124, pulsed detonation waves 242 may control temperature, pressure, or a mass flow of fluid flow 92.

Figure 9:
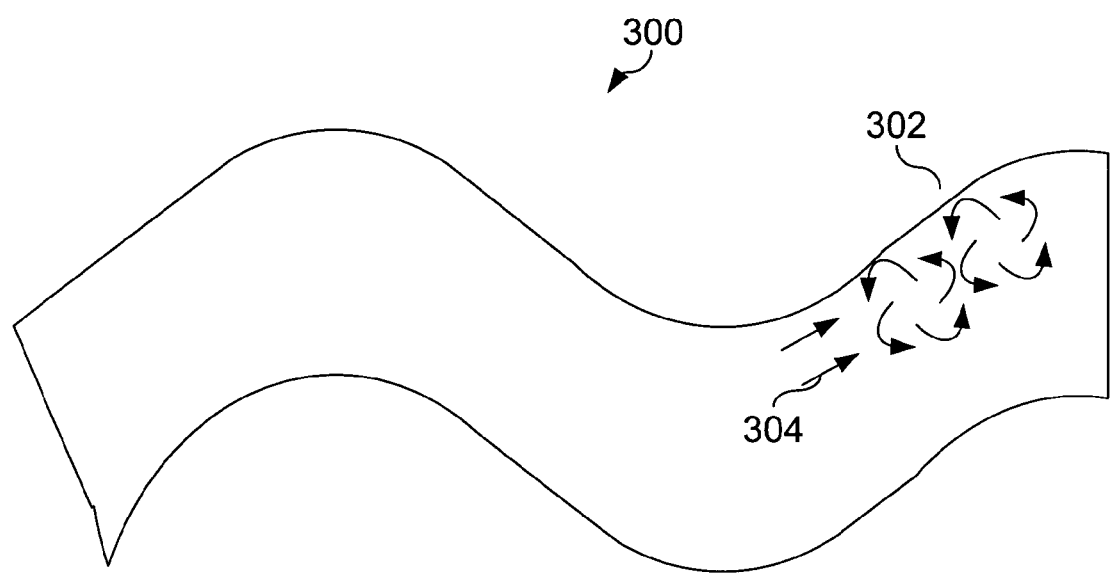
FIG. 9 is a schematic view of a curved duct illustrating the use of pulse detonation injection to manipulate flow separation within a curved duct in accordance with an embodiment of the present invention.

FIG. 9 provides a schematic view of a curved duct 300 illustrating the use of pulse detonation injection to control flow separation or one or more adverse secondary flows denoted by reference numeral 302. FIG. 9 generally shows a cross-section of curved duct 300. Arrows 304 depict the location and/or direction of the exhaust 302 of PDAs to control fluid flow through curved duct 300, such as by combating the effects of flow separation and adverse secondary flow. The technical advantage of using PDAs to control fluid flow through a curved duct is that the fluid flow will be more uniform and less turbulent, which will enhance the effectiveness of the fluid flowing through curved duct 300. Although a particular curved shape is shown in FIG. 9 for a curved duct, other suitable curved ducts that produce strong flow separations and adverse secondary flow are contemplated by the present invention.

Figure 10:
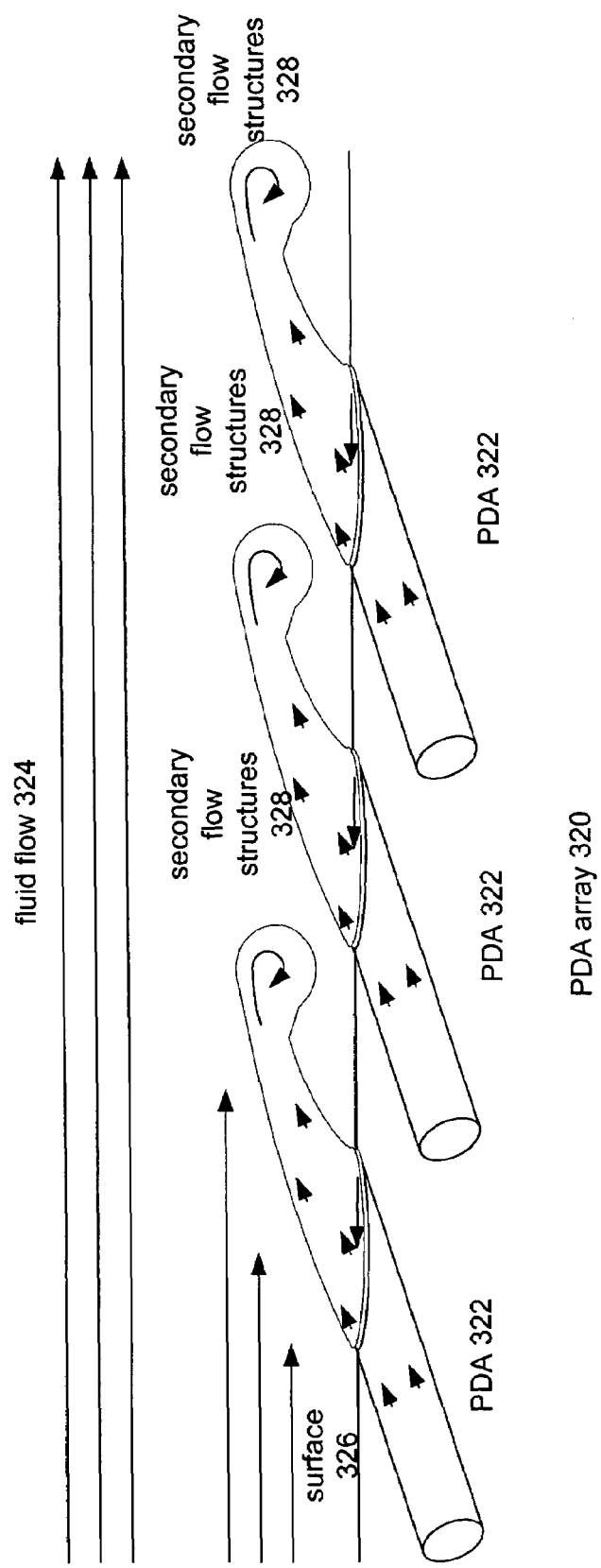
FIG. 10 depicts an array of pulse detonation actuators operable to introduce secondary flow structures in accordance with embodiments of the present invention.

FIG. 10 depicts an array 320 of PDAs 322. PDAs 322 may be embedded within in aerodynamic surface 326 over which fluid flow 324 flows. Aerodynamic surface 326 may be within a duct as illustrated in FIG. 9 or an exterior surface as will be shown in FIG. 11. PDAs 322 introduce a fluid flow 330 that causes secondary flow structures 328 to form in the near wall boundary layer between fluid flow 324 and aerodynamic surface 326. As shown PDAs 322 may be generally towards, normal or against fluid flow 324. PDAs 322 introduce secondary flow structures 328 that influence the inception point, size, and trajectory of flow field vortices within fluid flow 324. If PDAs 322 are oriented at greater angles, trapped secondary flow structures may be produced in the boundary layer between fluid flow 324 and aerodynamic surface 326. These trapped secondary flow structures may create a virtual aerodynamic surface.

Figure 11:
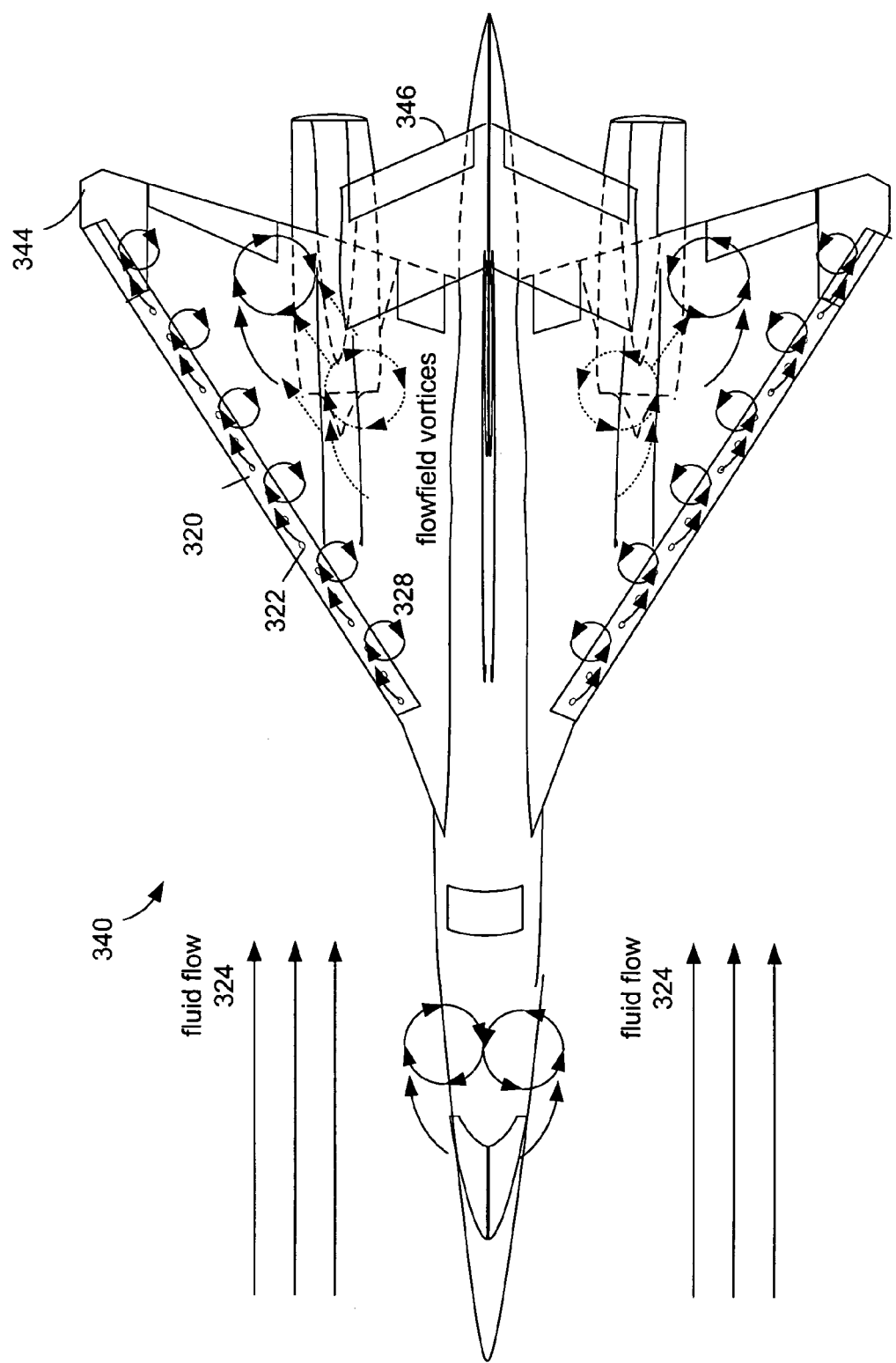
FIG. 11 depicts an aircraft utilizing an array of PDAs to influence flow-field vortices in accordance with the present invention.
Figure 12:
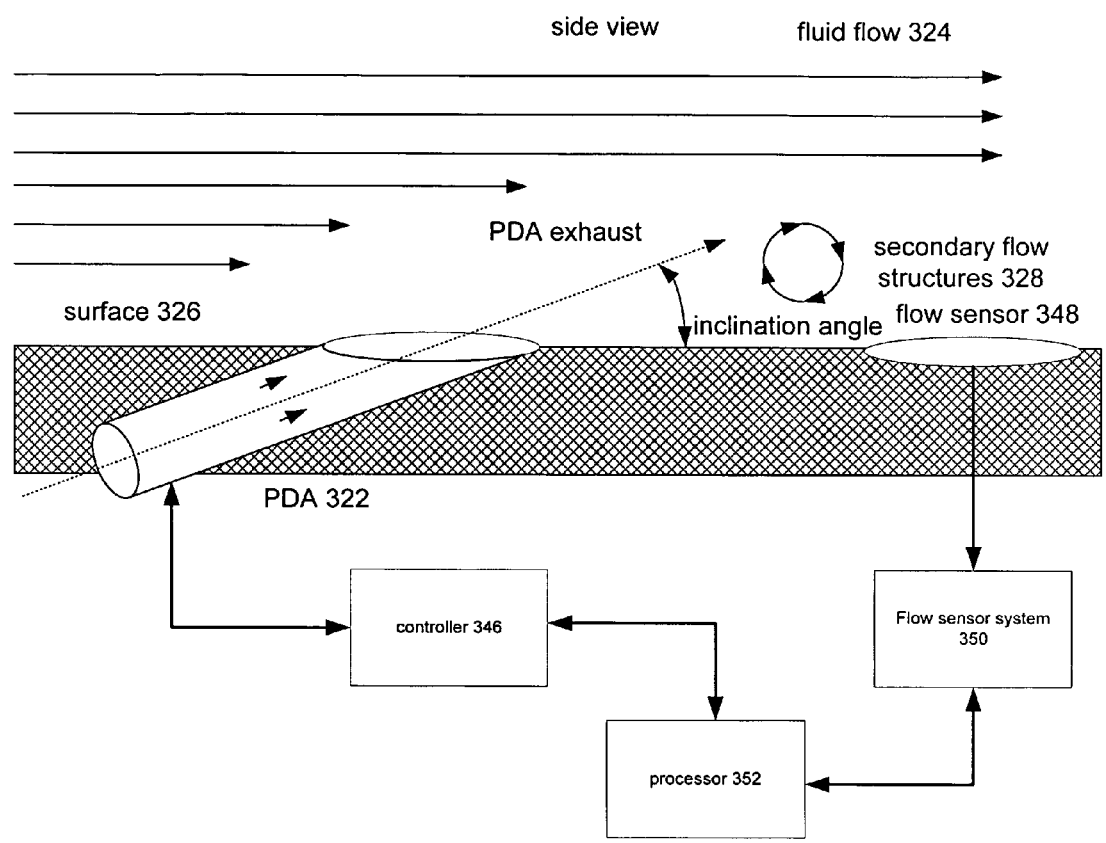
FIG. 12 provides a functional diagram of an aerodynamic surface or control surface operable to sense flow conditions and influence flow-field vortices over the aerodynamic surface in accordance with the present invention.

One potential implementation applies these PDA arrays to a vehicle, such as but not limited to aircraft. In FIG. 11, aerodynamic surface 326 is located on an aircraft. Other aerodynamic vehicles such as automobiles, trucks, trains, and boats that are sensitive to aerodynamic constraints may have the PDA array applied to address aerodynamic concerns and improve the aerodynamic performance of these vehicles.

FIG. 11 depicts aircraft 340 having PDAs incorporated within its aerodynamic surfaces to manipulate fluid flow 324. For example, flow field vortices generated from the trailing edge of external components on the aircraft can adversely affect downstream components of the aircraft such as but not limited to engines, weapons, fuel or storage nacelles, after body structures, such as the tail or empennage, control surfaces, canards, wings, air intake inlets, such as engine air inlets or sensor air inlets, or other downstream components known to those skilled in the art. As shown, arrays of PDAs 322 may be placed on the leading edge of wing 344. These PDAs induce secondary flow structures 328. These secondary flow structures may influence the inception point, size, and trajectory of flow field vortices away from downstream components as shown. Here flow field vortices, located over wing 344, if left unimpeded, would buffet empennage 346. However, these vortices are shifted outwards by the effect of the secondary flow structures 328. By reducing the buffeting and fatigue caused on downstream components, the structural requirements for these components may be reduced. Additionally, should the flow field vortices be ingested within an air inlet, potentially hazardous stresses can be placed on the aircraft engine resulting in stalling or component failure. For example, turbine blades within the aircraft engine may be severely stressed when ingesting flow field vortices. Thus, the performance of aircraft 340 may be improved significantly by actively shedding the flow field vortices in such a manner to reduce stresses on downstream components. Actively controlling the secondary flows may greatly improve the performance of aircraft or other aerodynamic structures.

These secondary flow structures 328 influence the flow field vortices over aerodynamic surface 326. A control system, such as controller 346, may be operably coupled to PDAs 322. This control system is operable to actively direct PDAs 322 to introduce secondary flows 328 in order to achieve a desired fluid flow 324 over aerodynamic surface 326.

This active control may be further complemented by a sensing system operably coupled to the PDA controllers. This sensing system may employ flow sensors 348 located at various locations along aerodynamic surface 326. These flow sensors are operable to detect the characteristics of fluid flow 324 over aerodynamic surface 326. Sensor outputs are provided to flow sensor system 350 and processor 354. Processor 354 compares the detected fluid flow characteristics over aerodynamic surface 326 with a desired fluid flow characteristic. Then processor 352 will actively direct controller 346 to introduce secondary flows 328 to achieve a desired fluid flow over aerodynamic surface 326.

Processor 352 and controller 346 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these PDAs and flow sensors may be incorporated in any aerodynamic surface. However, in many instances, more value may be realized by placing these systems within receptive zones of the aerodynamic surface such as the leading edge of the aerodynamic surfaces. The desired fluid flow may avoid having flow field vortices adversely impact downstream components. The desired fluid flow also reduces the fatigue or buffeting of downstream components.

Another embodiment provides an aerodynamic control surface that actively manipulates the flow field and/or boundary layer separation over the aerodynamic control surface. This aerodynamic control surface will have PDA arrays located substantially upstream of fluid flow over the control surface. These PDA arrays introduce secondary flows in the near wall boundary layer. These secondary flows reduce boundary layer separation over the aerodynamic control surface. By reducing boundary layer separation, the overall size of the control surface as well as support for the control surface may be reduced. In an aircraft, for example, this may result in significant weight reduction as the structural requirements associated with the aircraft control surfaces and their control systems may be reduced. A control system operably coupled to the PDA arrays may direct PDA arrays to introduce secondary flows in order to achieve desired fluid flow over the control surface.

Figure 13:
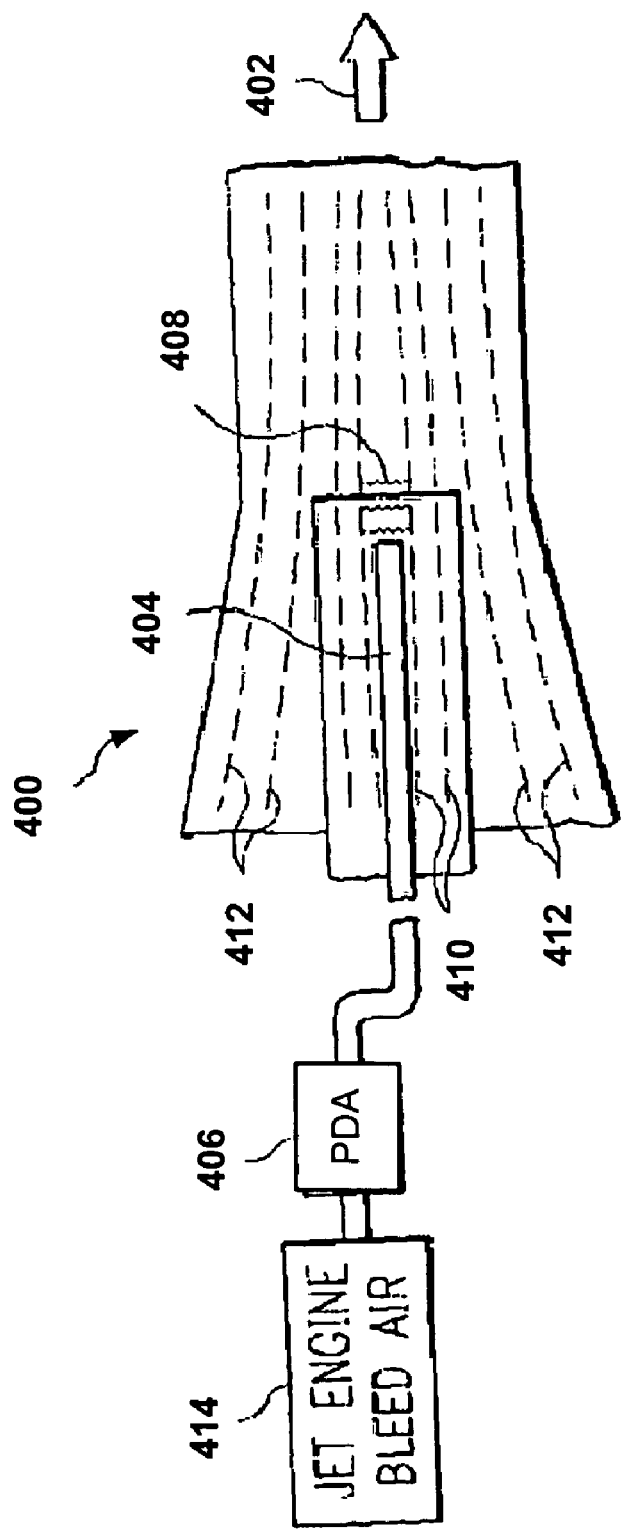
FIG. 13 is a cross-sectional view of an ejector in which pulse detonation ejection is used to control airflow through the ejector.

FIG. 13 depicts a cross-sectional view of an ejector 400, in which pulse detonation injection controls airflow 402 through ejector 400. Conduit 404 couples to a pulse detonation chamber 405 that injects detonation waves 408 into a primary flow 410. The high energy and velocity of detonation waves 408 enhances the velocity and entrainment of secondary injected fluid flow 412 as shown. A technical advantage of using pulsed detonation injection in an injector 500 is that the efficiency of the injector is greatly enhanced.

Figure 14:
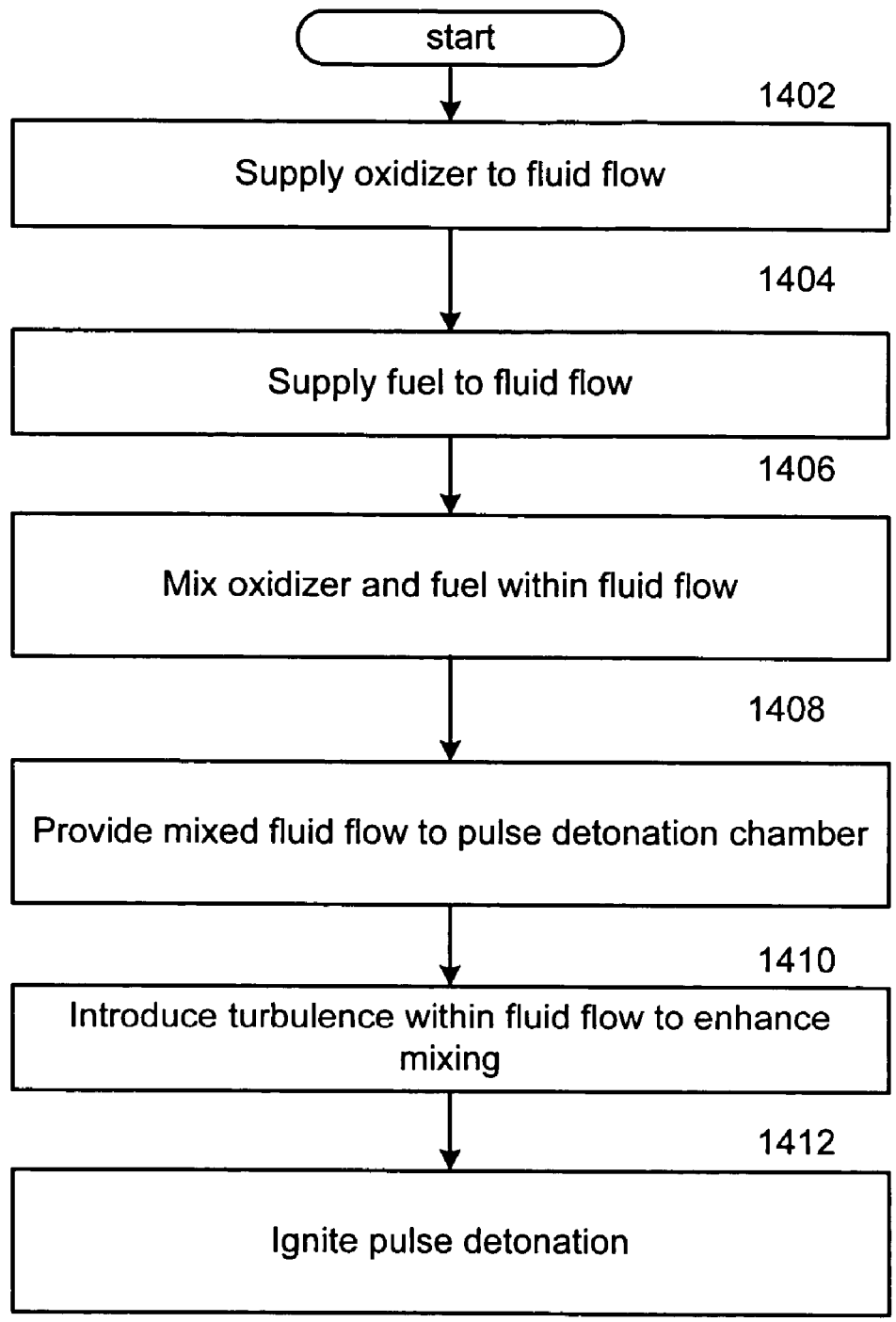
FIG. 14 is a logic flow diagram illustrating one method of enhancing the mixing of fuel and oxidizer within a pulse detonation chamber in accordance with embodiments of the present invention.

FIG. 14 provides a logic flow diagram illustrating a method to enhance the mixing of fuel and oxidizer within a pulse detonation chamber. This enhanced mixing may achieve a higher exhaust velocity of the high temperature and pressure gases exiting the pulse detonation chamber. In step 1402 a small amount of oxidizer may be supplied to the fluid flow. This oxidizer may be a small amount of external air and need not be air bled from the primary flow or compressed by upstream compressors. Step 1404 supplies fuel to the fluid flow. The oxidizer and fuel are mixed within the fluid flow in step 1406. This may be done within a mixing chamber prior to the fluid flow being introduced to the pulse detonation chamber. Alternatively, the oxidizer and fuel may simply be delivered to the pulse detonation chamber wherein the oxidizer and fuel within the fluid flow mix. In the case where the oxidizer and fuel are mixed they may be provided from a distribution manifold in step 1408 to the pulse detonation chamber. Turbulence introduced within the fluid flow within the pulse detonation chamber further enhances the mixing of the oxidizer and fuel. One embodiment introduces turbulence using a pulse detonation chamber insert such as that described with respect to FIGS. 4 and 5.

The embodiment in FIG. 4 provided a series of discs wherein fluid flow over the edge of the disc introduced vortices or other turbulence within the primary fluid flow which enhanced the mixing of fuel and oxidizer within the pulse detonation chamber. An igniter in step 1412 is used to ignite the pulse detonation within the pulse detonation chamber. Enhanced mixing of the oxidizer and fuel ensures that a higher percentage of the fuel within the fluid flow is oxidized. This reduces emissions. This may reduce or eliminate unburned fuel from the exhaust of the pulse detonation chamber. Thus, the specific thrust associated with the pulse detonation may be increased while decreasing the specific fuel consumption per pulse detonation for an equal amount of thrust generated. This methodology may be utilized within a pulse detonation actuator, which allows the pulse detonation to manipulate a primary fluid flow when the pulse detonation chamber is located at or near a boundary layer, proximate to the throat of a nozzle, or within a serpentine duct. This methodology may also be applied to pulse detonation engine, pulse detonation rocket engines, or hybrid pulse detonation engine.

In summary, the present invention provides a pulse detonation insert that induces flow obstructions within the pulse detonation chambers, wherein the flow obstructions are operable to induce turbulence within a primary fluid flow passing over the obstructions. This turbulence may take the form of vortices that enhance the mixing of the oxidizer and fuel within the primary flow. Additionally, supports couple to the pulse detonation chamber walls and flow obstructions to hold the flow obstructions in place within the pulse detonation chamber. The combustion of the mixed oxidizing fuel results in an increased velocity of the primary flow exiting the pulse detonation chamber and reduced the amount of unburnt fuel within the exhaust.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A pulse detonation engine comprising:
an oxidizer source; a fuel source; a distribution manifold coupled to the oxidizer source and the fuel source, wherein the distribution manifold is operable to deliver mixed fuel and oxidizer; a pulse detonation chamber operable to receive mixed fuel and oxidizer, wherein the pulse detonation chamber further comprises; an axis; containment walls operable to contain a pulse detonation; a thrust wall on which thrust is imparted by the pulse detonation, the thrust wall being axially upstream from the containment walls; an exhaust opening; an insert extending axially downstream from the thrust wall in a flow pathway of the mixed fuel and oxidizer within the pulse detonation chamber, the insert being free of contact with the containment walls, wherein the insert induces turbulence in the flow pathway of the mixed fuel and oxidizer and wherein the turbulence is operable to enhance mixing of the fuel and oxidizer; and an igniter positioned within the pulse detonation chamber operable to ignite the mixed fuel and oxidizer to produce the pulse detonation, wherein the insert further comprises: at least one flow obstruction operable to induce the turbulence within a primary flow comprising mixed fuel and oxidizer, the at least one flow obstruction comprising a ring that extends radially with respect to the axis, wherein the primary flow passes over the at least one flow obstruction and the turbulence is operable to enhance mixing of the oxidizer and fuel within the primary flow; and at least one support rod extending axially and coupled to the thrust wall, and operable to support the ring within the pulse detonation chamber.

2. The pulse detonation engine of claim 1, wherein the turbulence comprises vortices, and the at least one support rod comprises four support rods, each of which extends axially within the pulse detonation chamber.

3. The pulse detonation engine of claim 1, wherein the at least one flow obstruction comprises a plurality of discs.

4. The pulse detonation engine of claim 1, wherein combustion of the mixture of the oxidizer and fuel results in an increased velocity of the primary flow exiting the pulse detonation chamber, and the ring and the at least one support rod are coupled together with threads.

5. The pulse detonation engine of claim 1, wherein the at least one flow obstruction and at least one support are fabricated from materials resistant to a high pressure/temperature environment of the pulse detonation chamber, the igniter is located axially downstream from the thrust wall, and the insert extends axially downstream from the igniter.

6. The pulse detonation engine of claim 1, wherein the pulse detonation engine is a pulse detonation rocket or hybrid pulse detonation engine.

7. A pulse detonation actuator operable to be mounted at a fluid flow boundary wherein an exhaust of the pulse detonation actuator is operable to alter the fluid flow, wherein the pulse detonation actuator comprises: an oxidizer source; a fuel source; a distribution manifold coupled to the oxidizer source and the fuel source, wherein the distribution manifold is operable to deliver mixed fuel and oxidizer; a pulse detonation chamber operable to receive mixed fuel and oxidizer, wherein the pulse detonation chamber further comprises; an axis; containment walls operable to contain a pulse detonation; a thrust wall on which thrust is imparted by the pulse detonation, the thrust wall being axially upstream from the containment walls; an exhaust opening; an insert extending axially downstream from the thrust wall in a flow pathway of the mixed fuel and oxidizer within the pulse detonation chamber, the insert being free of contact with the containment walls, wherein the insert induces turbulence in the flow pathway of the mixed fuel and oxidizer and wherein the turbulence is operable to enhance mixing of the fuel and oxidizer; and an igniter positioned downstream from the thrust wall within the pulse detonation chamber operable to ignite the mixed fuel and oxidizer to produce the pulse detonation; the insert further comprises: at least one flow obstruction operable to induce the turbulence within a primary flow comprising mixed fuel and oxidizer, the at least one flow obstruction comprising, a series of rings that extend radially with respect to the axis, wherein the primary flow passes over the at least one flow obstruction and the turbulence is operable to enhance mixing of the oxidizer and fuel within the primary flow; and at least one support rod extending axially and coupled to the thrust wall, and operable to support the series of rings within the pulse detonation chamber.

8. The pulse detonation actuator of claim 7, wherein the turbulence comprises vortices, and the at least one support rod comprises four support rods, each of which extends axially within the pulse detonation chamber.

9. The pulse detonation actuator of claim 7, wherein combustion of the mixture of the oxidizer and fuel results in an increased velocity of the primary flow exiting the pulse detonation chamber, and the series of rings and the at least one support rod are coupled together with threads.

10. The pulse detonation actuator of claim 7, wherein the at least one flow obstruction and at least one support are fabricated from materials resistant to a high pressure/temperature environment of the pulse detonation chamber, and the insert extends axially downstream from the igniter.

* * * * *